(12) United States Patent
Isobe

(10) Patent No.: US 9,069,199 B2
(45) Date of Patent: Jun. 30, 2015

(54) LIQUID CRYSTAL MODULE AND LIQUID CRYSTAL DISPLAY DEVICE INCLUDING THE SAME

(75) Inventor: Hiroaki Isobe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 165 days.

(21) Appl. No.: 13/877,369

(22) PCT Filed: Oct. 5, 2011

(86) PCT No.: PCT/JP2011/072925
§ 371 (c)(1),
(2), (4) Date: Apr. 2, 2013

(87) PCT Pub. No.: WO2012/050013
PCT Pub. Date: Apr. 19, 2012

(65) Prior Publication Data
US 2013/0188113 A1    Jul. 25, 2013

(30) Foreign Application Priority Data

Oct. 12, 2010  (JP) .................................. 2010-229777

(51) Int. Cl.
*G02F 1/1333*  (2006.01)
*G02F 1/13*  (2006.01)
*G02F 1/1345*  (2006.01)
*G02F 1/1335*  (2006.01)

(52) U.S. Cl.
CPC ........ *G02F 1/133308* (2013.01); *G02F 1/1309* (2013.01); *G02F 1/13452* (2013.01); *G02F 2001/133314* (2013.01); *G02F 1/133608* (2013.01)

(58) Field of Classification Search
USPC ............ 349/58, 141, 152, 150, 149; 174/260, 174/255; 361/736
See application file for complete search history.

(56) References Cited

U.S. PATENT DOCUMENTS

| 7,728,919 | B2 * | 6/2010 | Tanaka ............................ 349/58 |
| 2004/0150961 | A1 * | 8/2004 | Frechette ....................... 361/736 |
| 2008/0138932 | A1 * | 6/2008 | Hatano et al. ................. 438/107 |
| 2008/0278903 | A1 * | 11/2008 | Ni et al. .......................... 361/684 |
| 2009/0135329 | A1 * | 5/2009 | Kim ................................ 349/58 |

FOREIGN PATENT DOCUMENTS

JP    03-204619 A    9/1991

OTHER PUBLICATIONS

Official Communication issued in International Patent Application No. PCT/JP2011/072925, mailed on Nov. 1, 2011.

* cited by examiner

*Primary Examiner* — Edward Glick
*Assistant Examiner* — William Peterson
(74) *Attorney, Agent, or Firm* — Keating & Bennett, LLP

(57) ABSTRACT

A liquid crystal module 15 includes a liquid crystal display panel 10; a rear frame member 44 located on a rear side of the liquid crystal display panel; and a wiring board 60 located on the rear side of the liquid crystal display panel. A part of the wiring board has an opening 65 running through the board and/or a notch 70 formed therein. An inspection patch 80A, 80B having a thickness equal to, or larger than, that of the wiring board is attached to the opening and/or the notch. A part of the wiring board around the inspection patch is secured to the rear frame member via a double-sided adhesive tape 55A, 55B.

9 Claims, 5 Drawing Sheets

US 9,069,199 B2

LIQUID CRYSTAL MODULE AND LIQUID CRYSTAL DISPLAY DEVICE INCLUDING THE SAME

TECHNICAL FIELD

The present invention relates to a liquid crystal module including a liquid crystal display panel, and a liquid crystal display device including the module; and specifically to a structure of attaching a wiring board to a rear side of the liquid crystal display panel.

The present application claims the benefit of priority based upon Japanese Patent Application No. 2010-229777 filed on Oct. 12, 2010, the entirety of which is incorporated herein by reference.

BACKGROUND ART

Liquid crystal display devices including a liquid crystal module which includes a liquid crystal display panel, which is typically rectangular, are in wide use as image display devices (displays) of TVs, personal computers and the like.

A liquid crystal display panel is electrically connected to an electronic component (e.g., driver IC) for supplying a signal for driving the panel. Such an electronic component is mounted on, for example, a flexible printed circuit (FPC). To a tip of the FPC, a wiring board having a controller for controlling the electronic component, other electronic components and the like incorporated thereinto is attached. The wiring board is typically secured to a frame member on a rear side of the liquid crystal display panel by use of a double-sided adhesive tape. Patent Document 1 describes a technology for securing a printed circuit board to a rear surface of a liquid crystal display element by use of a double-sided adhesive tape attached to the printed circuit board.

CITATION LIST

Patent Document

Patent Document 1: Japanese Patent Laid-Open Publication No. 3-204619

SUMMARY OF THE INVENTION

Technical Problem

However, with the above-described conventional art, when the wiring board and the frame member are not bonded together completely for the reason that the wiring body itself is bent or the like, it cannot be checked whether or not the wiring board is sufficiently secured to the frame member via the double-sided adhesive tape. In the case where the wiring board is not sufficiently secured to the frame member, a fault that the wiring board comes off from the frame member may possibly occur when a vibration is applied to the liquid crystal display device during, for example, transportation.

The present invention made for solving the above-described problem of the conventional art has an objective of providing a highly reliable liquid crystal module in which a wiring board is secured to a frame member, located on a rear side of a liquid crystal display panel, sufficiently firmly because it can be checked whether or not the wiring board is secured to the frame member, and a liquid crystal display device including such a module. The present invention has another objective of providing a method for inspecting a securing state of the wiring board to the frame member in a liquid crystal module and a liquid crystal display device.

Solution to the Problem

In order to achieve the above-described objective, the present invention provides a liquid crystal module and a liquid crystal display device including the module. A liquid crystal module according to the present invention includes a liquid crystal display panel; a rear frame member located on a rear side (reverse side) of the liquid crystal display panel; and a wiring board located on the rear side (reverse side) of the liquid crystal display panel. A part of the wiring board has an opening running through the board and/or a notch formed therein. An inspection patch (patch for inspection) having a thickness equal to, or larger than, that of the wiring board is attached to the opening and/or the notch. A part of the wiring board around the inspection patch is secured to the rear frame member via a double-sided adhesive tape. A liquid crystal display device according to the present invention includes any liquid crystal module disclosed herein. Typically, the liquid crystal display device includes a light source accommodated in the rear frame member.

In the liquid crystal module and the liquid crystal display device provided by the present invention, an inspection patch having a thickness equal to, or larger than, that of the wiring board is attached to the opening and/or the notch which is formed in a part of the wiring board. A part of the wiring board around the inspection patch is secured to the rear frame member via the double-sided adhesive tape.

According to this structure, it can be checked whether or not the part of the wiring board around the inspection patch is secured with certainty to the rear frame member via the double-sided adhesive tape. In the case where the part of the wiring board around the inspection patch is secured with certainty to the rear frame member via the double-sided adhesive tape, the surface of the inspection patch is at a level higher than, or equal to, that of the surface of the wiring board. In the case where the wiring board is not secured with certainty to the rear frame member via the double-sided adhesive tape (namely, a part of the wiring board floats above as seen from the rear frame member), the surface of the inspection patch is at a level lower than that of the surface of the wiring board. Accordingly, an inspector (operator) can easily inspect the securing state of the wiring board by merely checking whether or not the part of the wiring board around the inspection patch is at a level higher than that of the surface of the inspection patch (floats above the surface of the inspection patch).

In a preferable embodiment of the liquid crystal module disclosed herein, a through-hole is formed as the opening in a central area of the wiring board, which is an area on the side of a central position where a direct distance between a periphery and the central position of the wiring board is divided into two (e.g., equally divided into two).

The wiring board has a property of easily bending (easily floating above) in a central area than in a peripheral area. According to this structure, even when the wiring board is bent in the central area, it can be checked whether or not the wiring board is secured with certainty to the rear frame member by the inspection patch attached to the opening (through-hole).

In a preferable embodiment of the liquid crystal module disclosed herein, the wiring board has at least two openings.

According to this structure, it can be checked whether or not the wiring board is secured with certainty to the rear frame member by the inspection patch attached to each of a plurality of openings. Since the checking can be performed at a plurality of positions, the reliability of the wiring board being secured to the rear frame member is improved.

In a preferable embodiment of the liquid crystal module disclosed herein, the notch is formed by cutting off a side of the wiring board in a U-shape.

When a notch is formed in the wiring board and the inspection patch is attached to the notch, the floating of the board (a part of the board which is not secured) due to the bending of the peripheral portion of the wiring board is easily found by inspection. When the notch is formed in a U-shape, the level difference between the inspection patch and the part of the wiring board around the inspection patch can be clearly recognized. Therefore, the securing state of the wiring board to the rear frame member can be inspected more accurately.

In a preferable embodiment of the liquid crystal module disclosed herein, the wiring board is a glass epoxy board. A glass epoxy board has various preferable properties as a wiring board, but may be bent due to the inferior flexibility and a relatively large thickness thereof. For these reasons, the glass epoxy board is more difficult to be secured by a double-sided adhesive tape than a board of another material. Therefore, when a glass epoxy board is used as the wiring board, the effect provided by the structure of the present invention that the inspection patch is attached to the opening and/or the notch formed in a part of the wiring board is exerted more conspicuously.

In a preferable embodiment of the liquid crystal module disclosed herein, the wiring board is a flexible printed circuit (FPC). A flexible printed circuit is highly flexible and is relatively thin. For these reasons, it is difficult to check the securing state of the flexible printed circuit to the rear frame member. According to the present invention, even when an FPC is used, it can be checked whether or not the wiring board is secured to the rear frame member by inspecting the level difference between the inspection patch and the wiring board.

In a preferable embodiment of the liquid crystal module disclosed herein, the inspection patch is formed of a polymer and has a sheet-like shape.

An inspection patch of such a material and shape can be easily attached to the opening and/or the notch.

In a preferable embodiment of the liquid crystal module disclosed herein, the inspection patch has a color different from that of the part of the wiring board around the patch (for example, the color of the wiring board and the color of the inspection patch are complementary to each other).

According to this structure, the level difference between the inspection patch and the wiring board can be easily inspected visually.

As described above, according to the liquid crystal module or the liquid crystal display device including the liquid crystal module which are disclosed herein, it can be easily inspected whether or not the wiring board is secured with certainty to the rear frame member. Namely, in another aspect, the present invention provides a method for inspecting the securing state of the wiring board to the rear side of the liquid crystal display panel. The inspection method disclosed herein includes the following steps (1) and (2): (1) preparing any liquid crystal module or any liquid crystal display device disclosed herein; and (2) in the prepared liquid crystal module or liquid crystal display device, checking a level difference (step) between a surface of the inspection patch attached to the opening and/or the notch and a surface of the part of the wiring board around the inspection patch, thereby inspecting whether or not the wiring board is secured to the rear frame member.

According to the inspection method provided by the present invention, it can be checked whether or not the wiring board is secured to the rear frame member via the double-sided adhesive tape. Therefore, a highly reliable liquid crystal module in which the wiring board is secured to the rear frame member sufficiently firmly, and a liquid crystal display device including the liquid crystal module, are provided.

DESCRIPTION OF EMBODIMENTS

Hereinafter, the present invention will be described by way of preferable embodiments with reference to the drawings. Elements which are other than elements specifically referred to in this specification and are necessary to carry out the present invention may be grasped as a matter of design choice for a person of ordinary skill in the art based on the conventional art. The present invention can be carried out based on the contents disclosed by this specification and the attached drawings and the technological common knowledge in the art.

Figure 1:
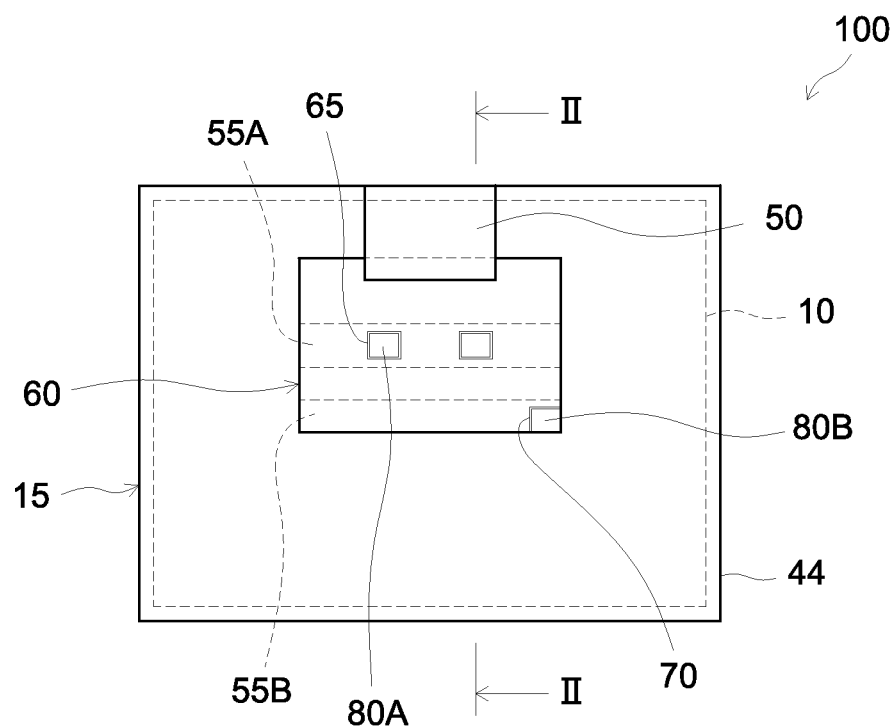
FIG. 1 is a plan view schematically showing a structure of a liquid crystal display device in an embodiment as seen from a rear side.
Figure 2:
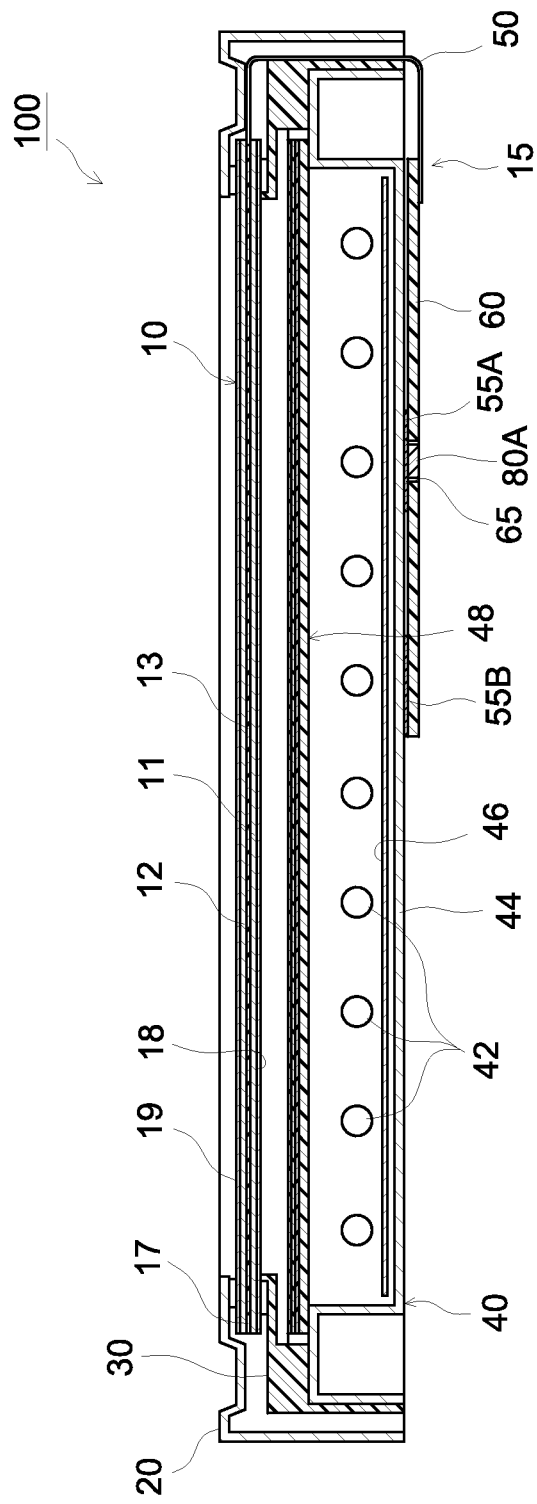
FIG. 2 is a cross-sectional view taken along line II-II in FIG. 1, which schematically shows the structure of the liquid crystal display device.

Hereinafter, with reference to FIG. 1 and FIG. 2, a liquid crystal display device 100 in a preferable embodiment (first embodiment) according to the present invention will be described. FIG. 1 is a schematic view schematically showing a structure of the liquid crystal display device 100 in this embodiment as seen from a rear side. FIG. 2 is a cross-sectional view taken along line II-II in FIG. 1. In FIG. 1 and FIG. 2, various types of electronic components mounted on a flexible printed circuit 50 and a wiring board 60 are not shown for the sake of simplicity.

In the figures referred to below, members or portions having the same functions bear the same reference signs and descriptions thereof may not be repeated or may be simplified. In the figures, the relative sizes (length, width, thickness, etc.) do not necessarily reflect the actual relative sizes. In the following description, the "front surface" or "frontal side" means the side of the liquid crystal display device 100 facing the observer (viewer) (i.e., liquid crystal display panel side), and the "rear surface" or "reverse side" means the side of the liquid crystal display device 100 not facing the observer (i.e., backlight unit 40 side).

With reference to FIG. 1 and FIG. 2, an overall structure of the liquid crystal display device 100 will be described. As shown in FIG. 2, the liquid crystal display device 100 includes a liquid crystal module 15 which includes a liquid crystal display panel 10, a rear frame member 44 located on the rear side of the liquid crystal display panel 10, and a wiring board 60. The rear frame member 44 accommodates external light sources 42. The light sources 42, the rear frame member 44 and the like are included in the backlight unit 40. The liquid crystal display panel 10 and the backlight unit 40 are assembled together by a bezel (frame) 20 or the like and thus are integrally held.

As shown in FIG. 1 and FIG. 2, the liquid crystal display panel 10 has a generally rectangular overall shape, and includes a display area which is an area having pixels formed in a central part thereof and is provided for displaying an image. As shown in FIG. 2, the liquid crystal display panel 10 has a sandwich structure including a pair of transparent glass substrates 11 and 12 facing each other and a liquid crystal layer 13 enclosed therebetween. Among the pair of glass substrates 11 and 12, the substrate located on a frontal side is a color filter substrate (CF substrate) 12, and the substrate located on the reverse side is an array substrate 11. A sealing member 17 is located along a peripheral portion of the CF substrate 12 and the array substrate 11 so as to surround the display area. The sealing member 17 seals the liquid crystal layer 13. The liquid crystal layer 13 is formed of a liquid crystal material containing liquid crystal molecules. When an electric field is applied between the array substrate 11 and the CF substrate 12, an alignment of the liquid crystal molecules in the liquid crystal material is controlled and thus optical characteristics of the liquid crystal molecules are changed. On surfaces of the substrates 11 and 12 facing each other (inner surfaces), alignment films (not shown) for determining the alignment direction of the liquid crystal molecules are respectively formed. Two surfaces of the substrates 11 and 12 not facing each other (outer surfaces), polarizer plates 18 and 19 are respectively bonded.

The liquid crystal display panel 10 disclosed herein has the following structure. The array substrate 11 includes, on the frontal side thereof (side facing the liquid crystal layer 13), pixels (not shown) for displaying an image, and a plurality of source lines and a plurality of gate lines arrayed in a lattice pattern, both of which are for driving the pixels (sub pixels). In each of lattice areas surrounded by these lines, a (sub) pixel electrode and a thin film transistor (TFT) as a switching element are provided. The pixel electrode is typically formed of ITO (Indium Tin Oxide), which is a transparent conductive material. The pixel electrodes are each supplied with a voltage in accordance with the image at a predetermined timing via the corresponding source line and the corresponding thin film transistor.

In the CF substrate 12, one of R (red), G (green), B (blue) and Y (yellow) color filters (not shown) is provided in correspondence with, so as to face, each pixel electrode of the array substrate 11. The CF substrate 12 also includes a black matrix for demarcating the color filters of different colors from each other and a counter electrode (transparent electrode) uniformly formed on a surface of the color filters and the black matrix.

The array substrate 11 is formed to be larger than (have a larger area size than that of) the CF substrate 12. In the state where the two substrates 11 and 12 overlap each other, a peripheral portion of at least one of four sides which form the periphery of the rectangular array substrate 11 slightly protrudes from the CF substrate 12. Along the protruding peripheral portion, the flexible printed circuit (FPC) 50 is provided as shown in FIG. 2. The FPC 50 has a liquid crystal display panel driving IC chips (driver IC chips) mounted thereon for driving the liquid crystal display panel 10. Since one end of the FPC 50 having such a structure is secured to the protruding peripheral portion, the FPC 50 is connected to electrodes (above-described pixel electrodes, counter electrode, etc.) included in the liquid crystal display panel 10. As shown in FIG. 1 and FIG. 2, the other end of the FPC 50 is attached to the wiring board (printed circuit board) 60, into which a controller for controlling the driver ICs (chips), other electronic components and the like are incorporated.

In the liquid crystal display panel 10 in this embodiment, as shown in FIG. 2, the FPC 50 is secured to the peripheral portion of one of four sides which form the periphery of the rectangular array substrate 11. Alternatively, a plurality of FPCs may be provided. Still alternatively, the FPC may be provided along two or three out of four sides which form the periphery of the rectangular array substrate or along the entire periphery of the rectangular array substrate.

As shown in FIG. 1 and FIG. 2, the FPC 50 attached to the peripheral portion of the liquid crystal display panel 10 is folded toward the rear side of the liquid crystal display panel 10. The wiring board 60 attached to the end of the FPC 50 is located on the rear frame member 44, which is located on the rear side of the liquid crystal display panel 10.

The wiring board 60 in this embodiment is, for example, a glass epoxy board formed to be rectangular. As shown in FIG. 1 and FIG. 2, a part of the wiring board 60 on which the electronic components and the like are not mounted has a plurality of through-holes 65 as openings running through the wiring board 60. Forming the plurality of through-holes 65 provides the following advantage. As described later, when an inspection patch 80A is attached to each of the through-holes 65, it can be checked at a plurality of positions whether or not a part of the wiring board 60 in the vicinity of the inspection patch 80A is secured with certainty to the rear frame member 44. As a result, the reliability of the wiring board 60 being secured to the rear frame member 44 is improved. The through-holes 65 are formed in the following central area of the wiring board, a direct distance between a periphery and a central position of the wiring board 60 is divided into two (e.g., equally divided into two). The central area is an area on the side of the central position (e.g., a position distanced from the periphery of the wiring board 60 by about 5 mm to 20 mm (preferably, about 7 mm to 10 mm) in a direction toward the central position of the board 60). The through-holes 65 are not limited to having any specific shape, and may have a horizontal cross-section which is circular, quadrangular, elliptical or the like. At a corner of the wiring board 60 (i.e., a point at which two out of four sides which form the periphery of the rectangular wiring board 60 contact each other), a notch 70 is formed by cutting off a part of the wiring board 60.

The wiring board 60 is secured to the rear frame member 44 via double-sided adhesive tapes 55A and 55B. The double-sided adhesive tape 55A is continuously located from one side of the wiring board 60 to another side thereof facing the one side, so as to overlap at least parts where the through-holes 65 are formed and the vicinity thereof. The double-sided adhesive tape 55B is continuously located from one side of the wiring board 60 to another side thereof facing the one side, so as to overlap at least a part where the notch 70 is formed and the vicinity thereof. Although two tapes, namely, the double-sided adhesive tapes 55A and 55B, are used in this embodiment, the number and the shape of the double-sided adhesive tapes are not specifically limited. A double-sided adhesive tape covering the entire surface of the wiring board 60 may be used to secure the wiring board 60 to the rear frame member 44, or a double-sided adhesive tape overlapping parts where the through-holes 65 are formed and the vicinity thereof may be used.

To the through-holes 65 as the openings and the notch 70 which are formed in the wiring board 60, inspection patches (patches for inspection) 80A and 80B having a thickness equal to that of the wiring board 60 are respectively attached. Namely, the inspection patch 80A is attached to through-hole 65 formed in the wiring board 60 and is secured to the rear frame member 44 via the double-sided adhesive tape 55A. Similarly, the inspection patch 80B is attached to the notch 70 formed in the wiring board 60 and is secured to the rear frame member 44 via the double-sided adhesive tape 55B. The inspection patches 80A and 80B may respectively have the same outer shapes as (typically, similar shapes to) those of the through-holes 65 and the notch 70. There is no specific limitation on the material of the inspection patches 80A and 80B. Usable materials include, for example, polymer materials such as polyethylene terephthalate (PET), polyethylene (PE), polypropylene (PP), polystyrene (PS), polyamide (nylon) and the like. Such a material is formed into a sheet. In this embodiment, the inspection patches 80A and 80B are formed of PET. In this embodiment, the inspection patches 80A and 80B are formed to have a thickness equal to that of the wiring board 60. Alternatively, the inspection patches 80A and 80B may be formed to have a thickness larger than that of the wiring board 60. For example, the inspection patches 80A and 80B may be formed to have a thickness larger than that of the wiring board 60 by about 0.1 mm to 0.5 mm The inspection patches 80A and 80B are not limited to having any specific color and may be transparent, but preferably have a color different from the color of the parts of the wiring board 60 around the inspection patches 80A and 80B (for example, preferably have a color complementary to the color of the parts of the wiring board 60 around the inspection patches 80A and 80B). When the inspection patches 80A and 80B have such a color, it can be easily determined whether or not the wiring board 60 is secured with certainty to the rear frame member 44 visually.

In the liquid crystal display device 100 in this embodiment, even when the wiring board 60 is bent in the central area, the parts of the wiring board 60 which are around the inspection patches 80A and 80B are secured with certainty to the rear frame member 44 via the double-sided adhesive tapes 55A and 55B. The securing state can be checked.

As shown in FIG. 2, the rear frame member 44 in the backlight unit 40 located on the rear side (reverse side) of the liquid crystal display panel 10 accommodates a plurality of linear light sources (typically, LEDs, cold-cathode fluorescent tubes, etc.) 42. The rear frame member 44 has a box-like shape which is opened toward the frontal side. In the rear frame member 44, the light sources 42 are located parallel to each other. Between the rear frame member 44 and the light sources 42, a reflective member 46 for efficiently reflecting light from the light sources 42 toward the viewer is located.

In the opening of the rear frame member 44, a plurality of sheet-like optical members 48 are stacked and located so as to cover the opening. The optical members 48 are, for example, a diffuser, a diffusion sheet, a lens sheet and a luminance increasing sheet which are located sequentially in this order from the backlight unit 40 side toward the liquid crystal display panel 10 side. The optical members 48 are not limited to being this combination of elements or being located in this order. The rear frame member 44 is further provided with a frame 30 having a generally frame-like shape in order to hold the optical members 48 in the state where the optical members 48 are fit into the rear frame member 44. On the reverse side of the rear frame member 44, an inverter circuit board (not shown) on which an inverter circuit is to be mounted and an inverter transducer (not shown) as a booster circuit for supplying power to each of the light sources 42 are provided.

As described above, the optical members 48 are located on the front side of the backlight unit 40. The frame 30 having an opening in an area corresponding to the display area of the liquid crystal display panel 10 is attached to the front side of the optical members 48 so as to hold the optical members 48 together with the backlight unit 40. On the front surface of the frame 30, the liquid crystal display panel 10 is located. On the front side of the liquid crystal display panel 10, the bezel 20 is attached.

Figure 3:
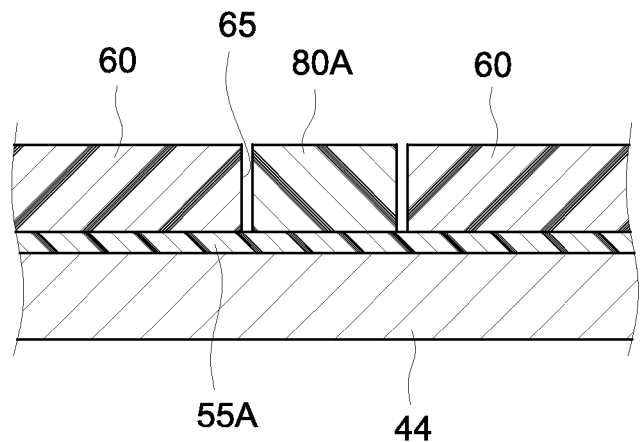
FIG. 3 is a cross-sectional view schematically showing a state where a part of a wiring board around an inspection patch is secured to a rear frame member via a double-sided adhesive tape.
Figure 4:
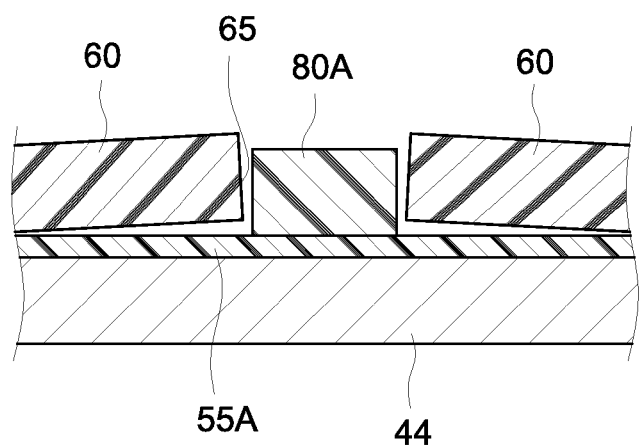
FIG. 4 is a cross-sectional view schematically showing a state where the part of the wiring board around the inspection patch is not secured to the rear frame member via the double-sided adhesive tape.

Now, a method for inspecting the securing state of the wiring board 60 to the rear frame member 44 will be described. Hereinafter, as a preferable example of inspection method, a case where the inspection patch 80A having a thickness equal to that of the wiring board 60 is attached will be described. FIG. 3 is a cross-sectional view schematically showing a state where the part of the wiring board 60 around the inspection patch 80A is secured to the rear frame member 44 via the double-sided adhesive tape 55A. FIG. 4 is a cross-sectional view schematically showing a state where the part of the wiring board 60 around the inspection patch 80A is not secured to the rear frame member 44 via the double-sided adhesive tape 55A.

The inspection method disclosed herein includes preparing the liquid crystal module 15 or the liquid crystal display device 100 including the liquid crystal module 15; and in the prepared liquid crystal module 15 or liquid crystal display device 100, checking a level difference between a surface of the inspection patch attached to the openings (e.g., through-holes) and/or the notch and a surface of the part of the wiring board around the patch, thereby inspecting whether or not the wiring board is secured to the rear frame member.

As shown in FIG. 3, in the case where the inspection patch 80A has a thickness equal to that of the wiring board 60 and the part of the wiring board 60 around the inspection patch 80A attached to the through-hole 65 is secured to the rear frame member 44 via the double-sided adhesive tape 55A, the surface of the inspection patch 80A and the surface of the wiring board 60 are flush with each other, with no level difference (no step) existing therebetween. By visually checking or touching such a portion, it can be confirmed that the wiring board 60 is secured with certainty to the rear frame member 44.

By contrast, as shown in FIG. 4, in the case where the inspection patch 80A has a thickness equal to that of the wiring board 60 and the part of the wiring board 60 around the inspection patch 80A attached to the through-hole 65 is not secured to the rear frame member 44 via the double-sided adhesive tape 55A, the surface of the inspection patch 80A and the surface of the wiring board 60 are not flush with each other, with a level difference (step) existing therebetween. Specifically, the surface of the part of the wiring board 60 around the inspection patch 80A is at a higher level than that of the surface of the inspection patch 80A. Therefore, by visually checking or touching such a portion of a higher level, it can be confirmed that the wiring board 60 is not secured to the rear frame member 44.

In the case where the inspection patch 80B is attached to the notch 70, substantially the same method as in the case where the inspection patch 80A is attached to the through-hole 65 can be used to check whether or not the wiring board 60 is secured to the rear frame member 44.

Even in the case where an inspection patch having a thickness larger than that of the wiring board is attached, it can be checked whether or not the wiring board is secured to the rear frame member by checking a level difference between the inspection patch and the part of the wiring board around the inspection patch. Typically, when the surface of the inspection patch is at a level higher than that of the surface of the wiring board, the wiring board is secured with certainty to the rear frame member. By contrast, when there is no level difference between the surface of the inspection patch and the surface of the wiring board, or when the surface of the inspection patch is at a level lower than that of the surface of the wiring board, the wiring board is not secured to the rear frame member.

Figure 5:
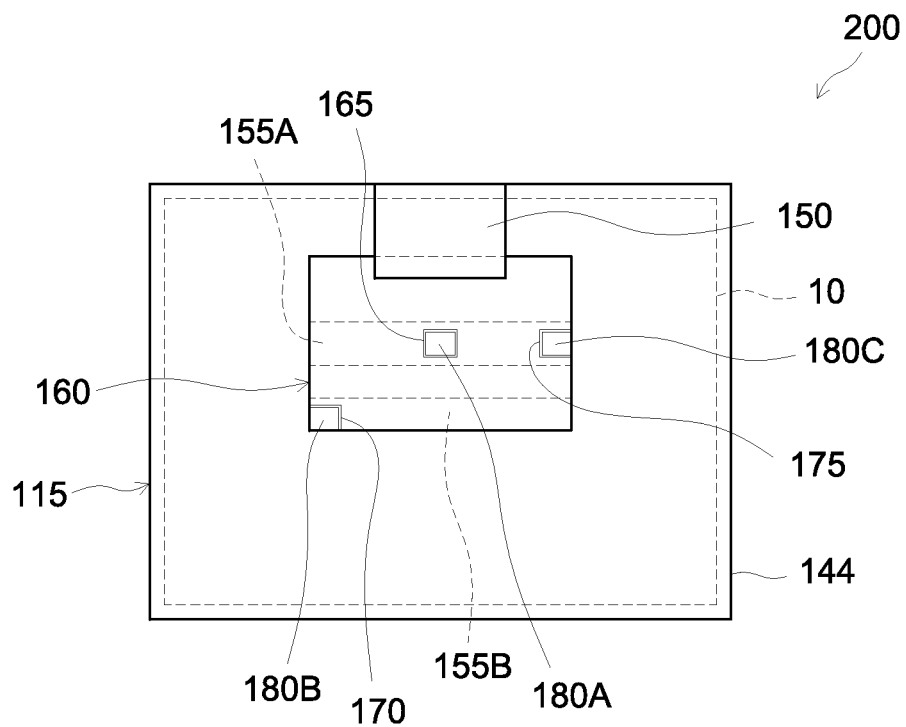
FIG. 5 is a plan view schematically showing a structure of a liquid crystal display device in another embodiment as seen from a rear side.

Now, with reference to FIG. 5, a liquid crystal display device 200 in a second embodiment will be described. FIG. 5 is a plan view schematically showing a structure of the liquid crystal display device 200 in the second embodiment as seen from a rear side. In FIG. 5, various types of electronic components mounted on an FPC 150 and a wiring board 160 are not shown for the sake of simplicity.

As shown in FIG. 5, a liquid crystal module 115 in this embodiment includes the liquid crystal display panel 10, a rear frame member 144, and the wiring board 160. A part of the wiring board 160 on which the electronic components and the like are not mounted has a through-hole 165 and a notch 170 having substantially the same structures as those of the through-holes and the notch in the first embodiment described above. The wiring board 160 in this embodiment further has a U-shaped notch 175 formed by cutting off a side of the wiring board 160 in a U-shape. By cutting off a part of the wiring board in a U-shape in this manner, the level difference between the inspection patch and the wiring board can be compared in a larger area. Therefore, it can be checked more accurately whether or not the wiring board is secured to the rear frame member. In this embodiment, the through-hole 165 and the U-shaped notch 175 are formed on a straight line parallel to two out of four sides which form the periphery of the rectangular wiring board 160. The form of the through-hole 165 and the U-shaped notch 175 is not limited to this. The U-shaped notch 175 merely needs to be formed by cutting off a side of the wiring board 160 in a U-shape. A plurality of U-shaped notches may be formed.

The wiring board 160 is secured to the rear frame member 144 via double-sided adhesive tapes 155A and 155B. The double-sided adhesive tape 155A is continuously located from one side of the wiring board 160 to another side thereof facing the one side, so as to overlap at least a part where the through-hole 165 is formed and the vicinity thereof and also a part where the U-shaped notch 175 is formed and the vicinity thereof. The double-sided adhesive tape 155B is formed in substantially the same manner as the double-sided adhesive tape 55B in the first embodiment. Although two tapes, namely, the double-sided adhesive tapes 155A and 155B, are used in this embodiment, the number and the shape of the double-sided adhesive tapes are not specifically limited.

To the through-hole 165 and the notch 170 which are formed in the wiring board 160, inspection patches 180A and 180B having a thickness equal to that of the wiring board 160 are respectively attached. In this embodiment, an inspection patch 180C having a thickness larger than that of the wiring board 160 is further attached to the U-shaped notch 175 and is secured to the rear frame member 144 via the double-sided adhesive tape 155A.

Hereinafter, with reference to the figures, a method for inspecting whether or not the wiring board 160 is secured with certainty to the rear frame member 144 by checking the inspection patch 180C attached to the U-shaped notch 175 will be described. Hereinafter, as a preferable example of inspection method, a case where the inspection patch 180C having a thickness larger than that of the wiring board 160 is attached will be described.

Figure 6:
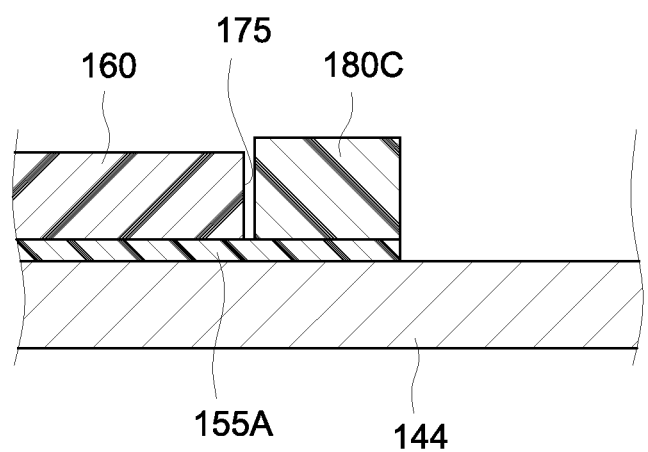
FIG. 6 is a cross-sectional view schematically showing a state where a part of a wiring board around an inspection patch is secured to a rear frame member via a double-sided adhesive tape in the another embodiment.

As shown in FIG. 6, in the case where the inspection patch 180C has a thickness larger than that of the wiring board 160 and a part of the wiring board 160 around the inspection patch 180C attached to the U-shaped notch 175 is secured to the rear frame member 144 via the double-sided adhesive tape 155A, a surface of the inspection patch 180C is at a higher level than that of a surface of the wiring board 160, with a step existing therebetween. By visually checking or touching such a portion, it can be confirmed that the wiring board 160 is secured with certainty to the rear frame member 144.

Figure 7:
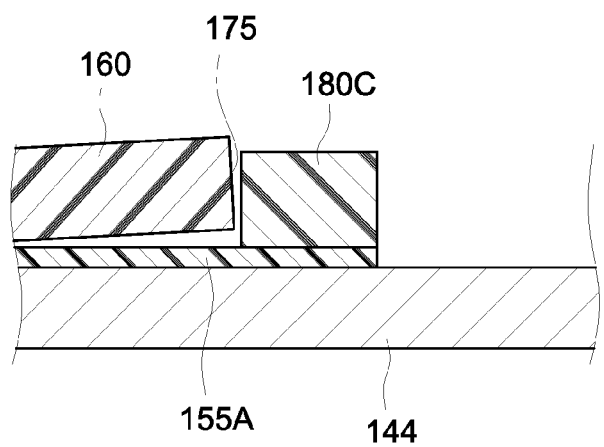
FIG. 7 is a cross-sectional view schematically showing a state where the part of the wiring board around the inspection patch is not secured to the rear frame member via the double-sided adhesive tape in the another embodiment.

By contrast, as shown in FIG. 7, in the case where the inspection patch 180C has a thickness larger than that of the wiring board 160 and the part of the wiring board 160 around the inspection patch 180C attached to the U-shaped notch 175 is not secured to the rear frame member 144 via the double-sided adhesive tape 155A, typically, the surface of the inspection patch 180C is at a level lower than that of the surface of the wiring board 160, with a step existing therebetween. By visually checking or touching such a portion, it can be confirmed that the wiring board 160 is not secured to the rear frame member 144.

In the case where an inspection patch having a thickness equal to that of the wiring board is attached to the U-shaped notch, substantially the same inspection method as in the first embodiment can be used to check whether or not the wiring board is secured to the rear frame member.

In the liquid crystal display device 200 in this embodiment, even when the wiring board 160 is bent in a central area and the vicinity thereof, the parts of the wiring board 160 which are around the inspection patches 180A, 180B and 180C are secured with certainty to the rear frame member 144 via the double-sided adhesive tapes 155A and 155B. The securing state can be checked.

Figure 8:
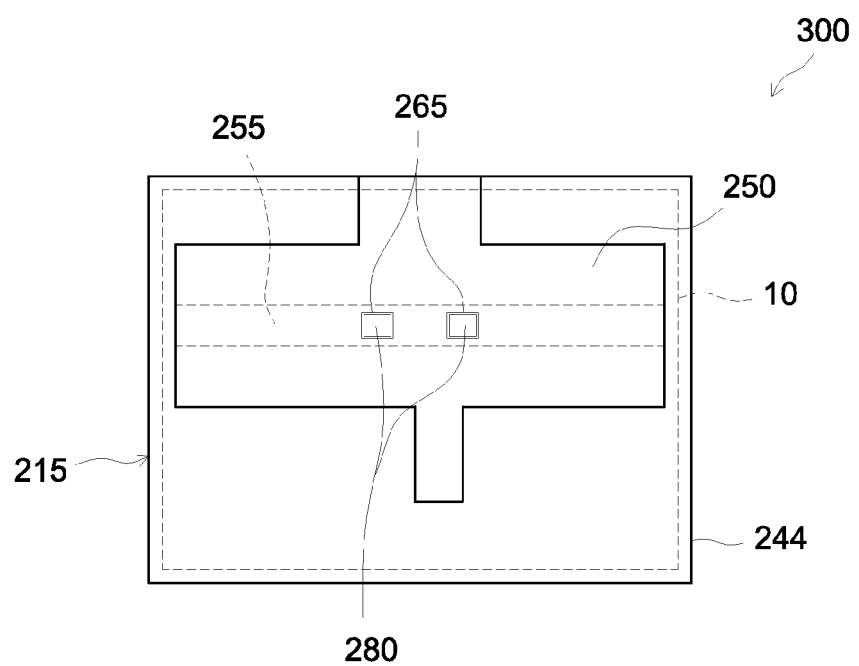
FIG. 8 is a plan view schematically showing a structure of a liquid crystal display device in still another embodiment as seen from a rear side.

Now, with reference to FIG. 8, a liquid crystal display device 300 in a third embodiment will be described. FIG. 8 is a plan view schematically showing a structure of the liquid crystal display device 300 in the third embodiment as seen from a rear side. In FIG. 8, various types of electronic components mounted on a wiring board 250 are not shown for the sake of simplicity.

As shown in FIG. 8, a liquid crystal module 215 in this embodiment includes the liquid crystal display panel 10, a rear frame member 244, and the wiring board 250. The wiring board 250 is a flexible printed circuit, and a part thereof is located on the array substrate 11 (see FIG. 2). On such a wiring board 250, driver IC chips (not shown), a controller (not shown) for controlling the driver IC chips, other electronic components and the like are mounted.

As shown in FIG. 8, a part of the wiring board 250 on which the electronic components and the like are not mounted has a plurality of through-holes 265 as openings running through the wiring board 250. The wiring board 250 is secured to the rear frame member 244 via a double-sided adhesive tape 255. The double-sided adhesive tape 255 is continuously located from one side of the wiring board 250 to another side thereof facing the one side, so as to overlap at least parts where the through-holes 265 are formed and the vicinity thereof. The number and the shape of the double-sided adhesive tapes are not specifically limited.

To the through-holes 265 which are formed in the wiring board 250, inspection patches 280 having a thickness equal to that of the wiring board 250 are respectively attached. The inspection patches 280 are secured to the rear frame member 244 via the double-sided adhesive tape 255.

In the liquid crystal display device 300 in this embodiment, even when the wiring board 250 is bent in a central area, the parts of the wiring board 250 which are around the inspection patches 280 are secured with certainty to the rear frame member 244 via the double-sided adhesive tape 255. The securing state can be checked.

So far, the present invention has been described by way of preferable embodiments. The above description does not limit the scope of the present invention, and the present invention may be modified in any of various manners, needless to say. For example, the inverter circuit board located on the rear frame member may be secured by a double-sided adhesive tape.

INDUSTRIAL APPLICABILITY

According to the present invention, a highly reliable liquid crystal module in which a wiring board is secured with certainty to a rear frame member located on a rear side of a liquid crystal display panel, and a liquid crystal display device including such a liquid crystal module, can be provided.

DESCRIPTION OF REFERENCE SIGNS

10 Liquid crystal display panel
11 Array substrate
12 Color filter substrate (CF substrate)
13 Liquid crystal layer
15 Liquid crystal module
17 Sealing member
18, 19 Polarizer plate
20 Bezel (frame)
30 Frame
40 Backlight unit
42 Light source
44 Rear frame member
46 Reflective member
48 Optical member
50 Flexible printed circuit (FPC)
55A, 55B Double-sided adhesive tape
60 Wiring board
65 Through-hole (opening)
70 Notch
80A, 80B Inspection patch
100 Liquid crystal display device
115 Liquid crystal module
144 Rear frame member
150 FPC
155A, 155B Double-sided adhesive tape
160 Wiring board
165 Through-hole
170 Notch
175 U-shaped notch
180A, 180B, 180C Inspection patch
200 Liquid crystal display device
215 Liquid crystal module
244 Rear frame member
250 Wiring board (FPC)
255 Double-sided adhesive tape
265 Through-hole
280 Inspection patch
300 Liquid crystal display device

The invention claimed is:

1. A method for inspecting a securing state of a wiring board to a rear side of a liquid crystal display panel, the method comprising:
    preparing a liquid crystal module;
    wherein the liquid crystal module comprises:
    a liquid crystal display panel;
    a rear frame member located on a rear side of the liquid crystal display panel; and a wiring board located on the rear side of the liquid crystal display panel;
    wherein:
    a part of the wiring board has an opening running through the board or a notch formed therein;
    an inspection patch having a thickness equal to, or larger than, that of the wiring board is attached to the opening or the notch; and
    a part of the wiring board around the inspection patch is secured to the rear frame member via a double-sided adhesive tape; and
    in the prepared liquid crystal module, checking a level difference between a surface of the inspection patch attached to the opening or the notch and a surface of the part of the wiring board around the inspection patch, thereby inspecting whether or not the wiring board is secured to the rear frame member.

2. The method according to claim 1, wherein a through-hole is formed as the opening in a central area of the wiring board, which is an area on the side of a central position where a direct distance between a periphery and the central position of the wiring board is divided into two.

3. The method according to claim 1, wherein the wiring board has at least two openings.

4. The method according to claim 1, wherein the notch is formed by cutting off a side of the wiring board in a U-shape.

5. The method according to claim 1, wherein the wiring board is a glass epoxy board.

6. The method according to claim 1, wherein the wiring board is a flexible printed circuit.

7. The method according to claim 1, wherein the inspection patch is formed of a polymer and has a sheet-like shape.

8. The method according to claim 1, wherein the inspection patch has a color different from that of the part of the wiring board around the patch.

9. The method according to claim 1, further comprising providing a light source for irradiating the liquid crystal display panel with light, the light source being accommodated in the rear frame member.

* * * * *